Figure 1:
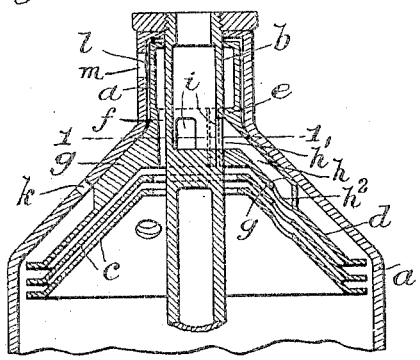

No. 797,297. PATENTED AUG. 15, 1905.
B. LJUNGSTRÖM.
CENTRIFUGAL LIQUID SEPARATOR.
APPLICATION FILED MAR. 14, 1905.

2 SHEETS—SHEET 1.

Witnesses:
Henry Drury
M. M. Hamilton

Inventor:
Berger Ljungström
by
Harding & Harding
atts

No. 797,297. PATENTED AUG. 15, 1905.
B. LJUNGSTRÖM.
CENTRIFUGAL LIQUID SEPARATOR.
APPLICATION FILED MAR. 14, 1905.

2 SHEETS—SHEET 2.

Witnesses:
Henry Drury
M. M. Hamilton

Inventor:
Birger Ljungström

UNITED STATES PATENT OFFICE.

BIRGER LJUNGSTRÖM, OF STOCKHOLM, SWEDEN, ASSIGNOR TO AKTIEBO-LAGET SEPARATOR, OF STOCKHOLM, SWEDEN, A COMPANY.

CENTRIFUGAL LIQUID-SEPARATOR.

No. 797,297.          Specification of Letters Patent.          Patented Aug. 15, 1905.

Application filed March 14, 1905. Serial No. 250,101.

*To all whom it may concern:*

Be it known that I, BIRGER LJUNGSTRÖM, a subject of the King of Sweden and Norway, residing at Stockholm, Sweden, have invented certain new and useful Improvements in Centrifugal Liquid-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to a feed device for the whole milk in liners for centrifugal separators, consisting of superposed conical plates, in which each of said plates is provided with holes situated at a radial distance from the central line of the bowl that approximately corresponds to the neutral zone of the fluid being subjected to the separating process. In liners of this kind the milk has been introduced at the bottom of the bowl through a central feed-pipe and filled the place beneath the undermost plate, whereafter by further supply of milk the same passed through the holes in the undermost plate and filled up the first space and then successively the other spaces in the liner, whereby the separating process took place in the known manner. For an illustration of a liner having such a construction and operation see the German Patent No. 82,875. This feed device is quite applicable in case the bottom of the bowl is plane and secured to the top of the driving-shaft. If, on the contrary, the bottom of the bowl is made convex inwardly, like the bottom of a bottle, and provided with a conical or cylindrical prolongated part in which the top of the driving-shaft is located, and this construction is now often used in modern centrifugal apparatus, certain difficulties arise if the milk is fed in at the bottom of the bowl, the principal inconvenience consisting in the difficulty of cleaning the closed inlet-tubes, which in this case must be relatively long.

My invention relates to centrifugal separators of the kind last mentioned, and has for object to feed the milk in such liners in such a way that a uniform distribution of the whole milk in the separating-spaces of the liner takes place while using only short and large inlet-passages, which are easy to clean.

My invention consists in means arranged and adapted to apply to a liner of this character by which the whole milk is fed in at the top of the liner instead of at the bottom. For this purpose either the "upper plate" or the central feed-pipe is provided with a flange-shaped enlargement, or a loosely-connected ring is fitted in between the central feed-pipe and the upper plate or between the central feed-pipe and the neck of the bowl, (if there is no upper plate,) or if the central feed-pipe and the upper plate are made in one single piece I make a flange or ring shaped enlargement at the junction of these parts. The whole milk is conducted through openings in the central feed-pipe situated above the liner and further through channels communicating with said openings and located in the above-named enlargements of the central feed-pipe or the upper plate, said channels ending in the uppermost separating-space, and thus establishing a communication between the central feed-tube and the separating-chamber. For directing the separated cream vertical channels are bored in the flange-shaped enlargements, said channels not communicating with the aforesaid channels for the whole milk. The separated blue milk is led off in the known manner through suitable openings in the bowl-neck.

Figure 4:
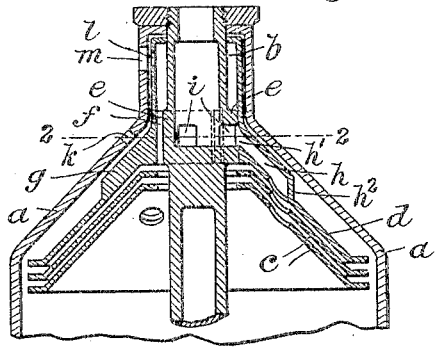
Figure 2:
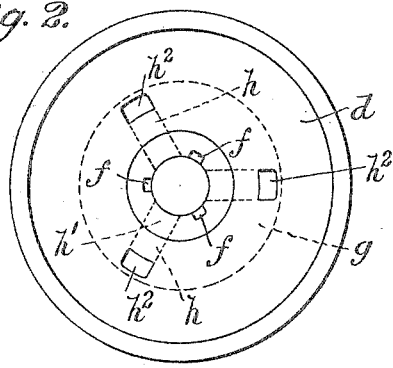
Figure 5:
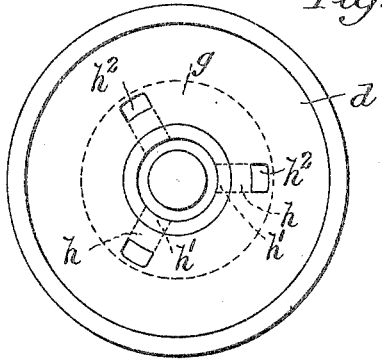
Figure 3:
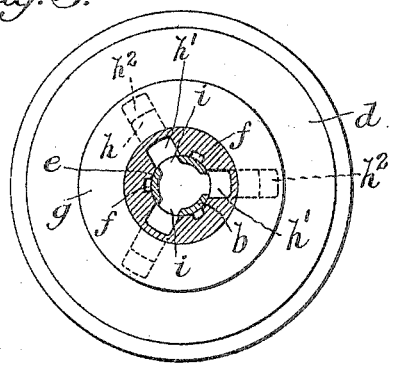
Figure 6:
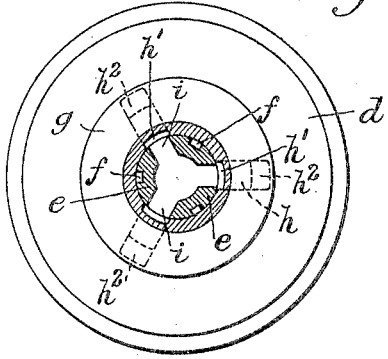
Figure 7:
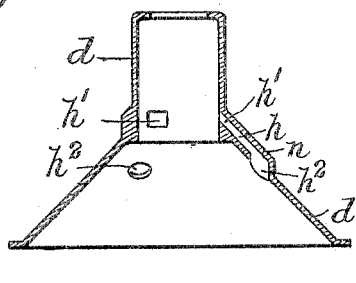
Figure 10:
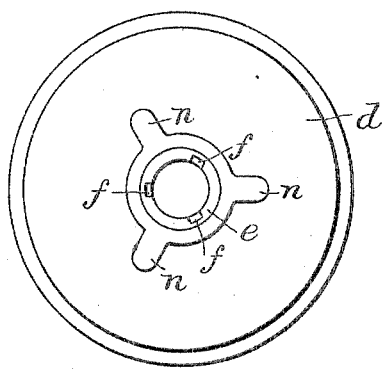
Figure 8:
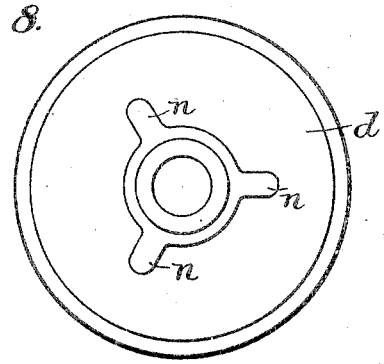
Figure 11:
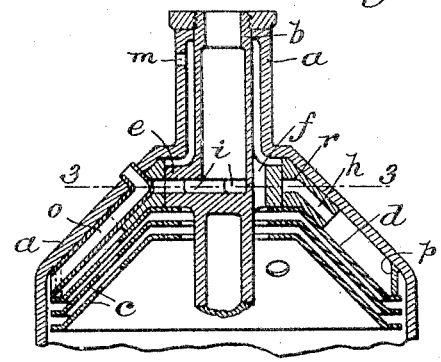
Figure 9:
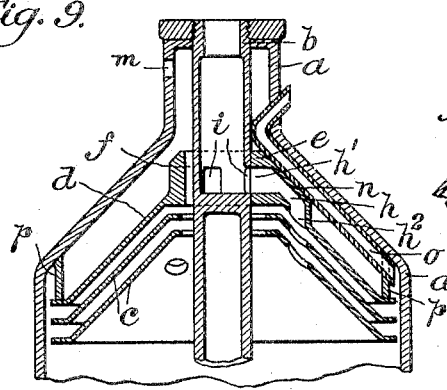
Figure 13:
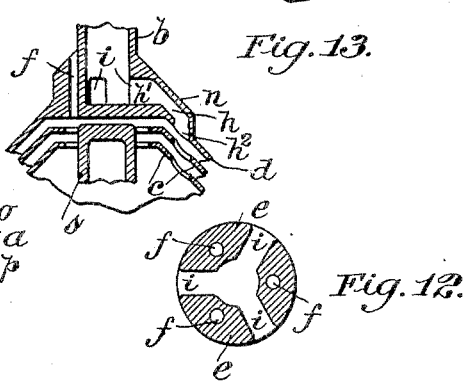
Figure 12:
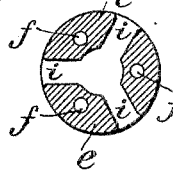

In the accompanying drawings, comprising two sheets, Figure 1 is a sectional elevation of the upper part of a centrifugal separator bowl provided with the improved feed device. Fig. 2 is an inverted plan view of the upper plate of Fig. 1. Fig. 3 is a cross-section on line 1 1, Fig. 1, the outer bowl being removed. Fig. 4 is a sectional elevation of the upper part of a centrifugal-separator bowl, showing a modified form of the feed device. Fig. 5 is an inverted plan view of the upper plate of Fig. 4. Fig. 6 is a cross-section on line 2 2, Fig. 4, the outer bowl being removed. Fig. 7 is a sectional elevation of a modified form of the upper plate. Fig. 8 is a plan view of same. Fig. 9 is a sectional elevation of the upper part of a centrifugal bowl provided with the improved feed device for the whole milk and with outlet-tubes for the separated skim-milk. Fig. 10 is a plan view of the upper plate of Fig. 9. Fig. 11 is a sectional elevation of the upper part of a centrifugal separator, showing a modified form of the improved feed device for the incoming whole milk. Fig. 12 is a cross-section of the central feed-tube on line 3 3, Fig. 11. Fig. 13 is a sectional elevation of still another modification of the improved feed device.

Like letters of reference refer to like parts in the several figures.

Referring to Figs. 1–3, $a$ is the bowl. $b$ is the central feed-pipe, $c$ the conical plates provided with a number of holes situated above each other, and $d$ is the upper plate, which is prolongated upwardly to the neck. The upper plate is provided with a flange $e$, closing tightly against the central feed-pipe. In this flange vertical holes or channels $f$ are bored, through which the separated cream passes upwardly to the cream-outlet. The upper plate is further provided with a ring-shaped thicker part or swelling $g$, in which channels $h$ are formed. The upper mouths $h'$ of said channels are situated directly in front of corresponding openings $i$ in the central feed-pipe, while the lower mouths $h^2$ are situated directly above the series of holes in the conical separating-plates $c$. The number of openings $i$ and channels $h$ corresponds to the number of rows or series of holes in the separating-plates.

The operation of the device described above is the following: The whole milk enters the central feed-pipe and passes through the openings $i$ into the channels $h$ in the upper plate and is therefrom distributed over the liner. The milk passes further through the openings in the separating-plates and fills successively all the spaces between the plates, whereby the separating process takes place in the well-known manner. The separated skim-milk escapes through holes $k$ in the bowl-neck, while the separated cream passes through the channels $f$ in the flange $e$ and escapes through holes $l$ and $m$ in the prolongated part of the upper plate and in the bowl-neck, respectively.

In the modification shown in Figs. 4, 5, and 6 the flange $e$ is formed in the central feed-pipe and tightens against the inner wall of the upper plate. As in the first-described construction, the cream-passages are located in this flange and do not communicate with the inlet-passages for the whole milk, said latter passages being, as in the first-described construction, located in the thicker part or swelling of the upper plate. The operation of this modified device is the same as that of the construction first described.

In Figs. 7 and 8 I have illustrated a modified form of upper plate, which may be substituted for the plate shown in Figs. 4–6. This upper plate differs from that shown in Figs. 4–6 in that the same is not provided with a ring-shaped thicker part or swelling, but only with humps $n$, in which the inlet-passages for the skim-milk are located. By this construction the upper plate is somewhat lightened.

In Fig. 9 another modified device is illustrated, in which the upper plate does not perform its usual function of directing the flow of skim-milk along its outer side and of cream along its inner side toward their respective discharge-orifices. Instead the skim-milk, as is often done, may be thrown off through one or more pipes located inside the bowl-neck. If such outlet-pipes for the skim-milk are used, the feed device for the whole milk may be modified, as shown in Figs. 9 and 10. As in the first-described construction, $a$ designates the bowl, $b$ the central feed-pipe, $c$ the separating-plates, and $d$ the upper or covering plate. This latter, which is shown in top view in Fig. 10, is provided with a ring-shaped flange $e$, tightening against the central feed-pipe $b$, in which flange the outlet-passages $f$ for the cream are located. The inlet-channels $h$ for the whole milk are located in humps $n$, (or in a ring-shaped thicker part or swelling of the covering-plate,) and said humps may either abut against the outlet-pipes for the skim-milk or be placed between them, and thereby abut against the inner wall of the bowl. If a ring-shaped swelling is used, the same is to be provided with grooves, in which the outlet-pipes for the skimmed-milk are located. The separated cream rises through the passages $f$ in the chamber between the upper plate and the bowl-neck and escapes through the outlet $m$. In order that the skim-milk may not be mixed with the separated cream, a ring $p$ is placed between the upper plate and the bowl through which the outer ends of the outlet-pipes for the skim-milk extend.

In the modified feed device illustrated in Figs. 11 and 12 the central feed-tube $b$ is provided with a flange $e$, in which the cream-passages $f$ are located. A ring-shaped piece $r$ is fitted in between the liner and the bowl, said ring tightening against said parts, as well as against the aforesaid flange on the central feed-tube. In the said ring-shaped piece channels $h$ are located, forming passages for the incoming whole milk and communicating with corresponding passages $i$ in the central feed-tube. The ring $r$ may be omitted, and tubes located immediately in front of the openings $i$ in the central feed-tube may be substituted.

In Fig. 12 I have shown the cream-passages $f$ located within the flange instead of in the edge thereof. It is obvious that this will not change the operation.

The modification illustrated in Fig. 13 resembles the construction shown in Fig. 9, differing therefrom in that the central feed-tube $b$ and the upper plate form a single piece. At the junction of these parts the piece is somewhat enlarged, and in this enlarged part the cream-passages $f$ are located. The passages for the incoming whole milk are located either in a ring-shaped enlargement or in humps $n$, the latter being shown in the drawings. In this case the central feed-tube $b$ and the shell or casing $s$, forming the bearing for the driving-shaft, may not form a single piece, but be separated from each other, as shown, in order that the conical plates may be taken out for cleaning purposes.

Having now fully described my invention, what I claim, and desire to protect by Letters Patent, is—

1. In a centrifugal liquid-separator, the combination, with the bowl, of a liner consisting of superposed conical division-plates and having a distributing-passage extending through the division-plates at a radial distance from the center line of the bowl, corresponding to its neutral zone, a feeding device having a channel, one end of which is adapted to receive the whole milk while the other end is adapted to discharge the whole milk into the upper end of the distributing-passage.

2. In a centrifugal liquid-separator, the combination, with the bowl, of a liner consisting of superposed conical division-plates and having a distributing-passage extending through the division-plates at a radial distance from the center line of the bowl corresponding to its neutral zone, a central feed-tube having an orifice therein, and a feeding device interposed between the feed-tube and the liner and having a channel communicating at one end with said orifice and at the other end with said distributing-passage.

3. In a centrifugal liquid-separator, the combination, with the bowl, of a liner consisting of superposed division-plates having a series of vertical distributing-passages extending through the division-plates at a radial distance from the center line of the bowl corresponding to its neutral zone, a feed-tube having a series of orifices and a feeding device having channels registering with the orifices in the feed-tube and the distributing-passages in the liner.

4. In a centrifugal liquid-separator, the combination, with the bowl, of a liner consisting of superposed conical division-plates and having a distributing-passage extending through the division-plates at a radial distance from the center line of the bowl corresponding to its neutral zone, a central feed-tube, and a feeding device located adjacent to the neck of the bowl and having a channel establishing communication between the feed-tube and the distributing-passage.

5. In a centrifugal liquid-separator, the combination, with the bowl having a cream-outlet in its neck, of a liner consisting of superposed conical division-plates and having a distributing-passage extending through the division-plates at a radial distance from the center line of the bowl corresponding to the neutral zone, a central feed-tube, and a feeding device having a channel establishing communication between the feed-tube and the distributing-passage, there being a vertically-extending orifice through said feed device to form a communication between the cream zone of the liner and the cream-outlet.

6. In a centrifugal liquid-separator, the combination, with the bowl having a cream-outlet in its neck, of a liner consisting of superposed conical division-plates and having a distributing-passage extending through the division-plates at a radial distance from the center line of the bowl corresponding to the neutral zone, a central feed-tube, and a feeding device confined between the upper division-plate and the wall of the bowl and having a channel establishing communication between the feed-tube and the distributing-passage.

7. In a centrifugal liquid-separator, the combination, with the bowl having a cream-outlet in its neck, of a liner consisting of superposed conical division-plates and having a distributing-passage extending through the division-plates at a radial distance from the center line of the bowl corresponding to the neutral zone, a central feed-tube, a flange thereon, a feeding device formed in the upper division-plate against the inner wall of which the flange of the central feed-tube tightens, there being a channel in the feeding device communicating at one end with the distributing-passage and at the other end with a channel extending through the flanged part of the feed-tube.

8. In a centrifugal liquid-separator, the combination with the bowl having a cream-outlet in its neck, of a liner consisting of superposed conical division-plates and having a distributing-passage extending through the division-plates at a radial distance from the center line of the bowl corresponding to the neutral zone, a central feed-tube, a flange thereon, a feeding device formed in the upper division-plate against the inner wall of which the flange of the central feed-tube tightens, there being a channel in the feeding device communicating at one end with the distributing-passage and at the other end with a channel extending through the flanged part of the feed-tube, there being a vertically-extending orifice through said flange to form a communication between the cream zone of the liner and the cream-outlet.

In testimony that I claim the foregoing as my invention I have signed my name in presence of two subscribing witnesses.

BIRGER LJUNGSTRÖM.

Witnesses:
HARRY FREDRIK ALBILM,
KNUT EDUARD WIBERG.